(12) United States Patent
Breidert

(10) Patent No.: US 12,306,517 B2
(45) Date of Patent: May 20, 2025

(54) METHOD FOR PRODUCING A CAMERA MODULE AND USE OF A CONTACT ELEMENT

(71) Applicant: Robert Bosch GmbH, Stuttgart (DE)

(72) Inventor: Joachim Breidert, Schwieberdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 136 days.

(21) Appl. No.: 18/253,767

(22) PCT Filed: Jan. 19, 2022

(86) PCT No.: PCT/EP2022/051077
§ 371 (c)(1),
(2) Date: May 19, 2023

(87) PCT Pub. No.: WO2022/167220
PCT Pub. Date: Aug. 11, 2022

(65) Prior Publication Data
US 2024/0103347 A1    Mar. 28, 2024

(30) Foreign Application Priority Data
Feb. 5, 2021 (DE) ..................... 10 2021 201 072.5

(51) Int. Cl.
*G03B 17/55* (2021.01)
*G02B 7/02* (2021.01)
(Continued)

(52) U.S. Cl.
CPC ............. *G03B 17/55* (2013.01); *G02B 7/025* (2013.01); *G02B 27/0006* (2013.01); *H04N 23/52* (2023.01); *H04N 23/55* (2023.01)

(58) Field of Classification Search
CPC ....................................................... G03B 17/55
See application file for complete search history.

(56) References Cited

U.S. PATENT DOCUMENTS

| 2010/0309553 A1 | 12/2010 | Nagamizu |
| 2018/0176431 A1 | 6/2018 | Kim et al. |

(Continued)

FOREIGN PATENT DOCUMENTS

| JP | 2011109853 A | 6/2011 |
| JP | 2015203822 A | 11/2015 |

OTHER PUBLICATIONS

International Search Report for PCT/EP2022/051077, Issued May 9, 2022.

*Primary Examiner* — Jeffry H Aftergut
(74) *Attorney, Agent, or Firm* — NORTON ROSE FULBRIGHT US LLP

(57) ABSTRACT

A method for producing a camera module which has an objective including an integrated heating device, and a housing including a printed circuit board and an image sensor. The method includes: inserting the objective into the housing, aligning the objective with respect to the image sensor, fixing the objective by producing an adhesive bond to the housing, electrically contacting the heating device integrated into the objective with the aid of preloaded and/or activatable, in particular thermally or electrically activatable, contact elements, which are brought into electrically conductive contact with contact surfaces formed on the outer circumference of the objective by releasing a loading apparatus and/or by activation, in particular by thermal or electrical activation. Use of a contact element is also described.

9 Claims, 3 Drawing Sheets

(51) Int. Cl.
*G02B 27/00* (2006.01)
*H04N 23/52* (2023.01)
*H04N 23/55* (2023.01)

(56) References Cited

U.S. PATENT DOCUMENTS

| | | |
|---|---|---|
| 2019/0033690 A1 | 1/2019 | Choi |
| 2019/0137723 A1* | 5/2019 | Bernal .................. H04N 23/55 |
| 2019/0302576 A1 | 10/2019 | Rafalowski et al. |
| 2020/0204712 A1* | 6/2020 | Kim ...................... G02B 7/021 |
| 2020/0233209 A1 | 7/2020 | Choi et al. |
| 2020/0314311 A1 | 10/2020 | Liu et al. |

* cited by examiner

METHOD FOR PRODUCING A CAMERA MODULE AND USE OF A CONTACT ELEMENT

FIELD

The present invention relates to a method for producing a camera module which has an objective comprising an integrated heating device, and a housing comprising a printed circuit board and an image sensor. The camera module can be used in particular in a motor vehicle, for example for monitoring the surroundings of the motor vehicle.

Furthermore, the use of a contact element for electrically contacting a heating device integrated into an objective of a camera module is specified.

BACKGROUND INFORMATION

A camera module used for surroundings monitoring is exposed to environmental influences, and therefore wet condensation and/or ice formation can occur on an optical lens of the objective. If this is the case, there is a risk of the image sensor of the camera module receiving no signals or only poor signals. This is to be avoided, for example with the aid of a heating device integrated into the objective.

The heating device integrated into the objective must be electrically contacted. For this purpose, contact elements can be used which produce a connection of the heating device to a printed circuit board of the camera module accommodated in a housing. Since the accessibility of the contact elements or the printed circuit board is no longer ensured after the joining of the camera module, in particular after the insertion of the objective into the housing, the electrical contacting of the heating device is usually already carried out before the insertion or during the insertion. The use of flexible contact elements, such as, for example, foil conductors or cables, makes it possible to compensate for tolerances, for example in order to align the objective with respect to an image sensor. The use of flexible contact elements further has the advantage that, when the objective is subsequently glued to the housing, the adhesive bond remains at least approximately force-free. However, it proves disadvantageous that the achievable joining speeds are limited when flexible or pliable foil conductors or cables are used.

An object of the present invention is to make the electrical contacting of a heating device integrated into an objective more secure and at the same time simpler. The object may be achieved by the method for producing a camera module and by the use, according to the present invention.

SUMMARY

A method according to the present invention is used to produce a camera module which has an objective comprising an integrated heating device, and a housing comprising a printed circuit board and an image sensor. According to an example embodiment of the present invention, the method comprises the following steps:
  inserting the objective into the housing,
  aligning the objective with respect to the image sensor,
  fixing the objective by producing an adhesive bond to the housing,
  electrically contacting the heating device integrated into the objective with the aid of preloaded and/or activatable, in particular thermally or electrically activatable, contact elements, which are brought into electrically conductive contact with contact surfaces formed on the outer circumference of the objective by releasing a loading apparatus and/or by activation, in particular by thermal or electrical activation.

The heating device integrated into the objective is therefore electrically contacted only after the insertion, alignment and fixing of the objective with respect to the housing. This means at a time at which the adhesive bond used for fixing the objective is cured to such an extent that it can absorb forces. The adhesive bond and thus the position of the objective with respect to the image sensor thus remain unaffected by the still to be produced electrical contacting of the heating device.

The electrical contacting of the heating device after the objective has been inserted into the housing, aligned and fixed is made possible by the proposed use of preloaded and/or activatable, in particular thermally or electrically activatable, contact elements. This is because these contact elements can be applied to the contact surfaces provided on the objective by releasing a loading apparatus and/or by activation, in particular by thermal or electrical activation. This means that the application is effected contactlessly, and therefore the lack of accessibility of the contact elements is not a problem.

According to an example embodiment of the present invention, contact elements in the form of spring arms are preferably used for carrying out the proposed method. With the aid of such contact elements, the distance between the heating device and the printed circuit board can be bridged in a simple manner.

Furthermore, contact elements in the form of spring arms can be preloaded in a simple manner by means of a loading apparatus.

According to an example embodiment of the present invention, more preferably, contact elements are used which are diametrically opposite one another on the objective. In this case, the contact elements can be preloaded radially with the aid of the loading apparatus, so that a release of the loading apparatus automatically leads to the application of the contact elements to the contact surfaces provided on the objective. For this purpose, the contact surfaces are preferably arranged in a corresponding manner, i.e., diametrically opposite, on the objective.

Furthermore, according to an example embodiment of the present invention, it is provided that the contact elements be electrically conductively connected, preferably welded or soldered, to the printed circuit board at the other end, i.e., at their ends facing away from the contact surfaces of the objective. The contact elements and the printed circuit board can thus form a preassembled unit. This facilitates optical inspection of the electrically conductive connection of the contact elements to the printed circuit board, since the preassembly can take place before the objective is inserted into the housing.

According to a first preferred embodiment of the present invention, contact elements preloaded with the aid of the loading apparatus are used. The contact elements are then applied to the contact surfaces of the objective by releasing the loading apparatus.

For this purpose, the loading apparatus can be hook-shaped or annular, at least in some regions. With the aid of a loading apparatus which is hook-shaped or annular at least in some regions, the preloaded contact elements can be held back until the objective has been inserted into the housing, aligned with respect to the image sensor and fixed with the aid of the adhesive bond.

If the loading apparatus is hook-shaped at least in some regions, it can be brought into locking engagement with at least one contact element. The loading apparatus can be released by unlocking. The loading apparatus preferably comprises multiple hook elements, with the number of hook elements also preferably corresponding to the number of contact elements to be preloaded.

If the loading apparatus is annular at least in some regions, it can be arranged such that it holds the contact elements at a distance from the contact surfaces provided on the objective. The loading apparatus preferably comprises at least one ring which is axially displaceable relative to the contact elements. The ring is then axially displaced to release the loading apparatus.

Alternatively or additionally, according to an example embodiment of the present invention, it is provided that a loading apparatus be used which at least in some regions is manufactured from a bimetal, a shape memory material, for example a shape memory alloy or a shape memory polymer, or a shrink-fit material. The loading apparatus can thus be activated or released from the outside, i.e., contactlessly. For example, by activating, in particular thermally or electrically activating, a first part of the loading apparatus, a deformation of this part can be brought about, which then triggers a movement of a further part, for example an axially displaceable ring, of the loading apparatus.

The loading apparatus used for preloading the contact elements is therefore preferably released by displacement and/or activation, in particular by thermal or electrical activation.

According to a further preferred embodiment of the present invention, activatable, in particular thermally or electrically activatable, contact elements are used, which at least in some regions are manufactured from a bimetal, a shape memory material, for example a shape memory alloy or a shape memory polymer, or a shrink material. In this case, a separate loading apparatus for preloading the contact elements is dispensable, since these are activatable, in particular thermally or electrically activatable, themselves to produce the electrical contacting. The activation of the contact elements causes a deformation through which the contact elements come to bear against the contact surfaces of the objective. The deformation can preferably only be achieved in one direction, so that the thus produced electrical contacting of the heating device is permanent. This means that preferably a material is used that retains its shape after the deformation and does not return to its initial shape.

For example, melting wires can be used as thermally or electrically activatable contact elements, by means of which an electrically conductive contact with the contact surfaces of the objective can be produced after thermal or electrical activation.

Furthermore, for the electrical contacting of a heating device integrated into an objective of a camera module, the use of a contact element is provided, which at least in some regions is manufactured from a bimetal, a shape-memory material, for example a shape-memory alloy or a shape-memory polymer, or a shrink-fit material, and is electrically conductively connected, preferably welded or soldered, to a printed circuit board at one end. This enables secure electrical contacting of the heating device in a simple manner.

Preferred embodiments of the present invention are explained in more detail below with reference to the figures.

DETAILED DESCRIPTION OF EXAMPLE EMBODIMENTS

Figure 1:
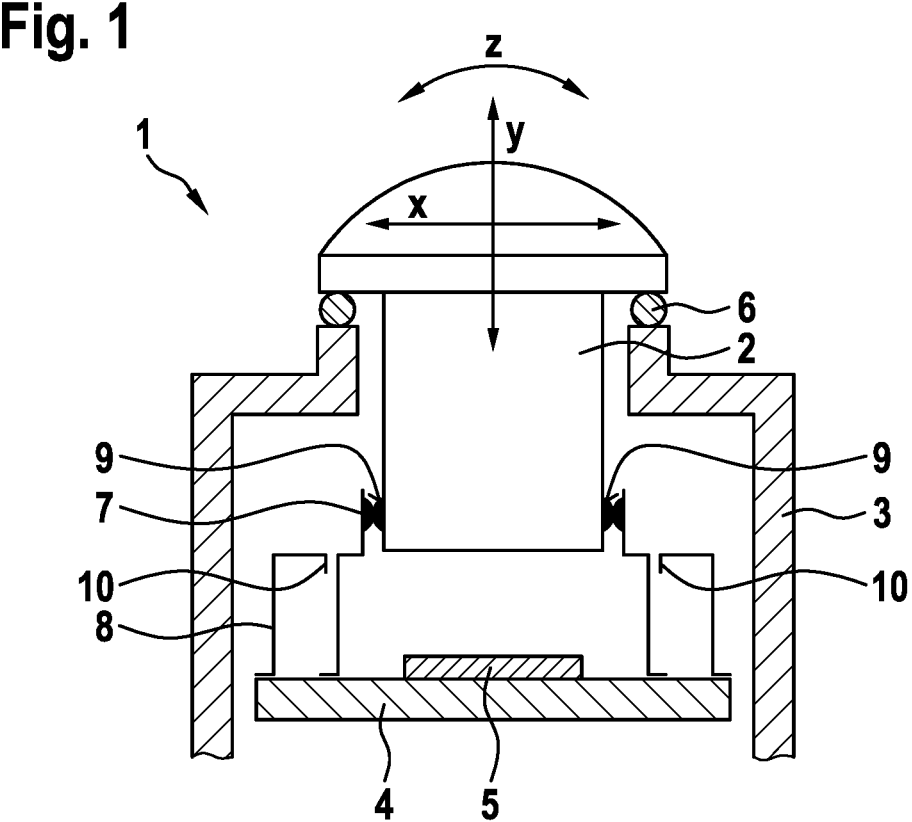
FIG. 1 is a schematic longitudinal section through a camera module which can be produced by a first method according to an example embodiment of the present invention.

FIG. 1 shows a camera module 1 comprising an objective 2, into which a heating device (not shown) is integrated. Two contact surfaces 9, which are diametrically opposite one another on the objective 2, are provided on the outer circumference of the objective 2 for the electrical contacting of the heating device. The objective 2 is inserted into a housing 3, so that the contact surfaces 9 come to lie within the housing 3. The objective 2 is also glued to the housing 3 via an adhesive bond 6. The adhesive bond 6 can be produced only after the objective 2 has been aligned with respect to an image sensor 5 accommodated in the housing 3. In the process, the objective 2 is moved or pivoted in different directions x, y, z. In order to enable these movements, the heating device integrated into the objective 2 is electrically contacted only after the alignment of the objective 2 and after the production of the adhesive bond 6.

Figure 2:
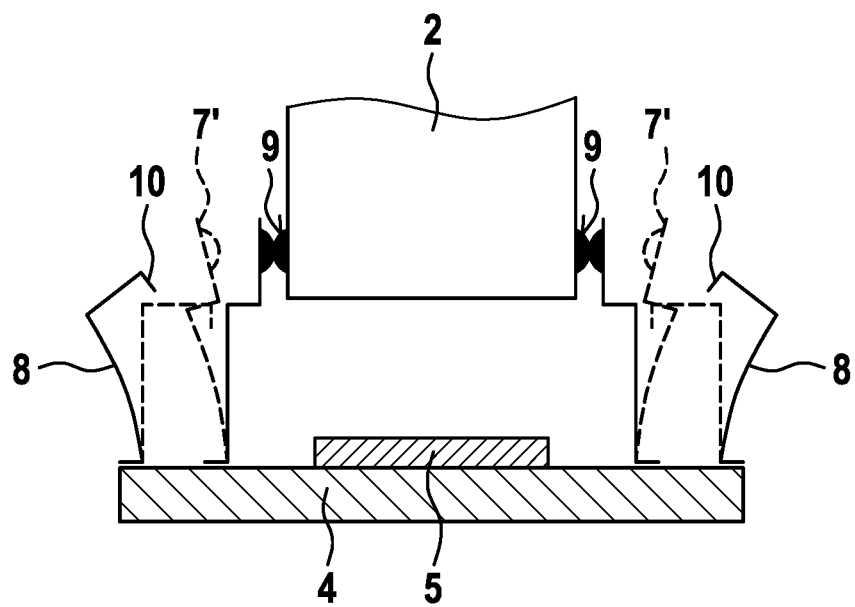
FIG. 2 is an enlarged detail of FIG. 1.

In FIG. 1, the electrical contacting is produced via two contact elements 7 which are diametrically opposite one another on the objective 2 and which are electrically conductively connected at the other end to a printed circuit board 4 accommodating the image sensor 5. As can be seen in particular from FIG. 2, the contact elements 7 are in the form of spring arms which can be preloaded with the aid of a loading apparatus 8 so that a distance from the contact surfaces 9 provided on the objective 2 is maintained. For this purpose, the loading apparatus 8 has two spring arm-like elements which are arranged radially on the outside in relation to the contact elements 7 and have hook elements 10 at their free ends. These can be brought into engagement with the contact elements 7, so that they hold the contact elements 7 back, preferably until the adhesive bond 6 between the objective 2 and the housing 3 is cured (see dashed illustration of the contact elements 7'). If the loading apparatus 8 is then released, the preloaded contact elements 7 come to bear against the contact surfaces 9 of the objective 2 and the electrical contacting of the heating device is produced.

Figure 3:
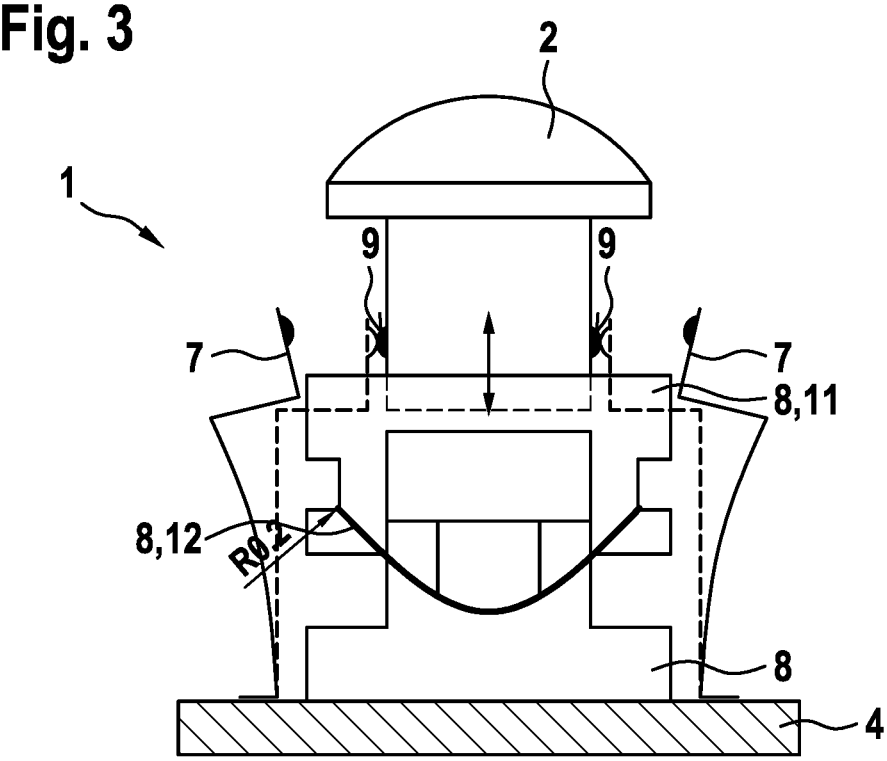
FIG. 3 is a schematic longitudinal section through a camera module which can be produced by a second method according to an example embodiment of the present invention.

FIG. 3 shows a further camera module 1 which comprises an objective 2 comprising an integrated heating device (not shown). Again, only the contact surfaces 9 provided on the outer circumference of the objective 2 for electrical contacting of the heating device are shown. Also not shown is the housing 3 of the camera module 1, which is designed analogously to the housing 3 of the camera module 1 of FIG. 1 and is connected to the objective 2 via an adhesive bond 6.

FIG. 3 shows contact elements 7 in the form of spring arms which can be brought into contact with the contact surfaces 9 provided on the objective 2 by releasing a loading apparatus 8. For this purpose, the loading apparatus 8 has a ring 11 which is mounted in an axially displaceable manner (see arrow) and is held by means of a bracket 12 in a position in which the ring 11 holds the contact elements 7 at a distance from the contact surfaces 9. The bracket 12 is manufactured from a material which deforms as a result of thermal or electrical activation. The deformation of the bracket 12 causes an axial displacement of the ring 11, so that the loading apparatus 8 is released and the contact elements 7 come to bear against the contact surfaces 9 (see dashed lines).

Figure 4:
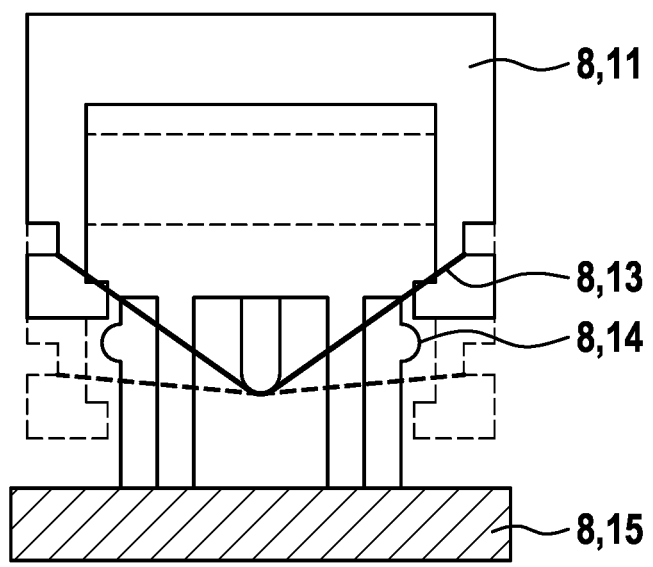
FIG. 4 is a schematic longitudinal section through a camera module which can be produced by a third method according to an example embodiment of the present invention.

FIG. 4 shows a variant of the loading apparatus 8 shown in FIG. 3. Instead of the bracket 12, thin activatable wire-like elements 13 cause the displacement of the ring 11. The wire-like elements 13 are braced between the ring 11 and a stationary base 15. Activation causes the length of the wire-like elements 13 to be shortened, leading to a displacement of the ring 11. A latching element 14 prevents unintentional displacement of the ring 11 before the wire-like element 13 is activated.

Figure 5:
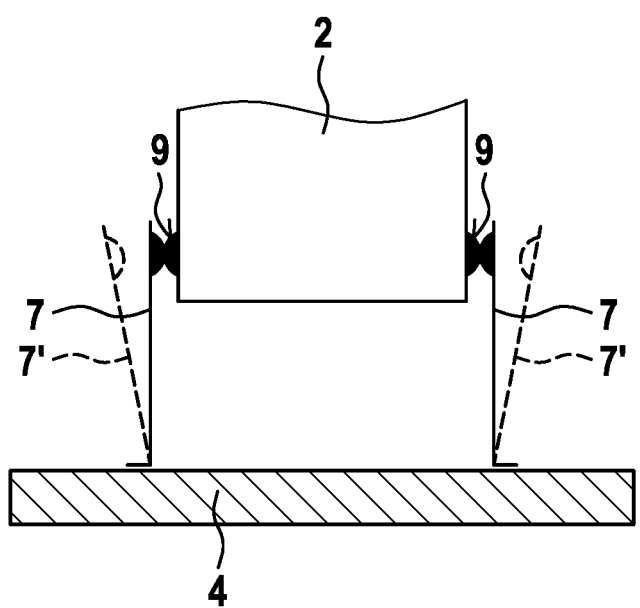
FIG. 5 is a schematic longitudinal section through a camera module which can be produced by a fourth method according to an example embodiment of the present invention.

The further camera module 1 shown in FIG. 5 can be produced particularly easily by a method according to the present invention. The illustration of FIG. 5 is limited to the parts essential for carrying out the method, namely the objective 2 with the contact surfaces 9 on the outer circumference and the contact elements 7 connected to the printed circuit board 4. The contact elements are manufactured from an activatable, in particular thermally or electrically activatable, material, for example a shape memory material. The activation of the material causes the contact elements 7 to deform and come to bear against the contact surfaces 9 only via the deformation.

What is claimed is:

1. A method for producing a camera module which has an objective including an integrated heating device, and a housing including a printed circuit board and an image sensor, the method comprising the following steps:
    inserting the objective into the housing;
    aligning the objective with respect to the image sensor;
    fixing the objective by producing an adhesive bond to the housing; and
    electrically contacting the heating device integrated into the objective using preloaded and/or thermally or electrically activatable, contact elements, which are brought into electrically conductive contact with contact surfaces formed on an outer circumference of the objective by releasing a loading apparatus and/or by thermal or electrical activation.

2. The method according to claim 1, wherein the contact elements are in the form of spring arms and/or diametrically opposite one another on the objective, the contact elements being electrically conductively connected to the printed circuit board at another end.

3. The method according to claim 2, wherein the contact elements are welded or soldered to the printed circuit board.

4. The method according to claim 1, wherein the contact elements are preloaded using the loading apparatus, and the loading apparatus, at least in some regions, is:
    hook-shaped or annular and/or
    manufactured from a bimetal, or a shape memory material, or a shrink-fit material.

5. The method according to claim 4, wherein the loading apparatus is manufactured from the shape memory material, the shape memory material being a shape memory polymer.

6. The method according to claim 1, wherein the loading apparatus is released by displacement and/or by thermal or electrical activation.

7. The method according to claim 1, wherein the contact elements are thermally or electrically activatable, and wherein at least in some regions of the contact elements, the contract elements are manufactured from a bimetal or a shape memory material or a shrink-fit material.

8. The method according to claim 7, wherein in at least some regions of the contact elements, the contact elements are manufactured from a shape memory material, the shape memory material being a shape memory polymer.

9. A method, comprising:
    providing a contact element which at least in some regions is manufactured from a bimetal or a shape-memory material or a shrink-fit material;
    electrically conductively connecting the contact element to a printed circuit board at one end of the contact element, and electrical contacting a heating device integrated into an objective of a camera module at another end of the contact element.

* * * * *